United States Patent [19]
Englehart

[11] 3,989,190
[45] Nov. 2, 1976

[54] MECHANICAL CONTROL FOR FOGGING SYSTEMS

[76] Inventor: Paul G. Englehart, 984 S. Grapevine Road, Golden, Colo. 80401

[22] Filed: Mar. 25, 1975

[21] Appl. No.: 561,862

[52] U.S. Cl. ................................ 239/70; 74/3.54; 137/624.15
[51] Int. Cl.² ................... A01G 27/00; B05B 1/30; B05B 12/02
[58] Field of Search ............... 137/624.13, 624.15; 251/251, 252, 232; 239/70, 69; 74/3.5, 3.52, 3.54

[56] References Cited
UNITED STATES PATENTS

| | | | |
|---|---|---|---|
| 2,550,410 | 4/1951 | Garrett et al. | 137/624.15 X |
| 2,638,110 | 5/1953 | Parks | 137/624.15 X |
| 3,172,604 | 3/1965 | Brock | 239/70 |
| 3,211,179 | 10/1965 | Lilly et al. | 137/624.15 X |
| 3,301,486 | 1/1967 | Brock | 239/70 |
| 3,319,654 | 5/1967 | Faldi | 137/624.13 |
| 3,345,915 | 10/1967 | Dotto | 137/624.13 X |
| 3,647,116 | 3/1972 | Nixon et al. | 74/3.54 X |
| 3,720,232 | 3/1973 | Corliss et al. | 137/624.15 X |
| 3,782,630 | 1/1974 | Sabo | 239/70 |

*Primary Examiner*—Robert S. Ward, Jr.
*Attorney, Agent, or Firm*—Ronald F. Weiszmann

[57] ABSTRACT

A control mechanism for use with portable fogging systems or the like, comprising a mechanical timer, a mechanical cam and lever device, and sequential valving to control the time and pressure volume of flow of pressurized air or the like through the nozzle(s) of a fogging system or the like.

7 Claims, 4 Drawing Figures

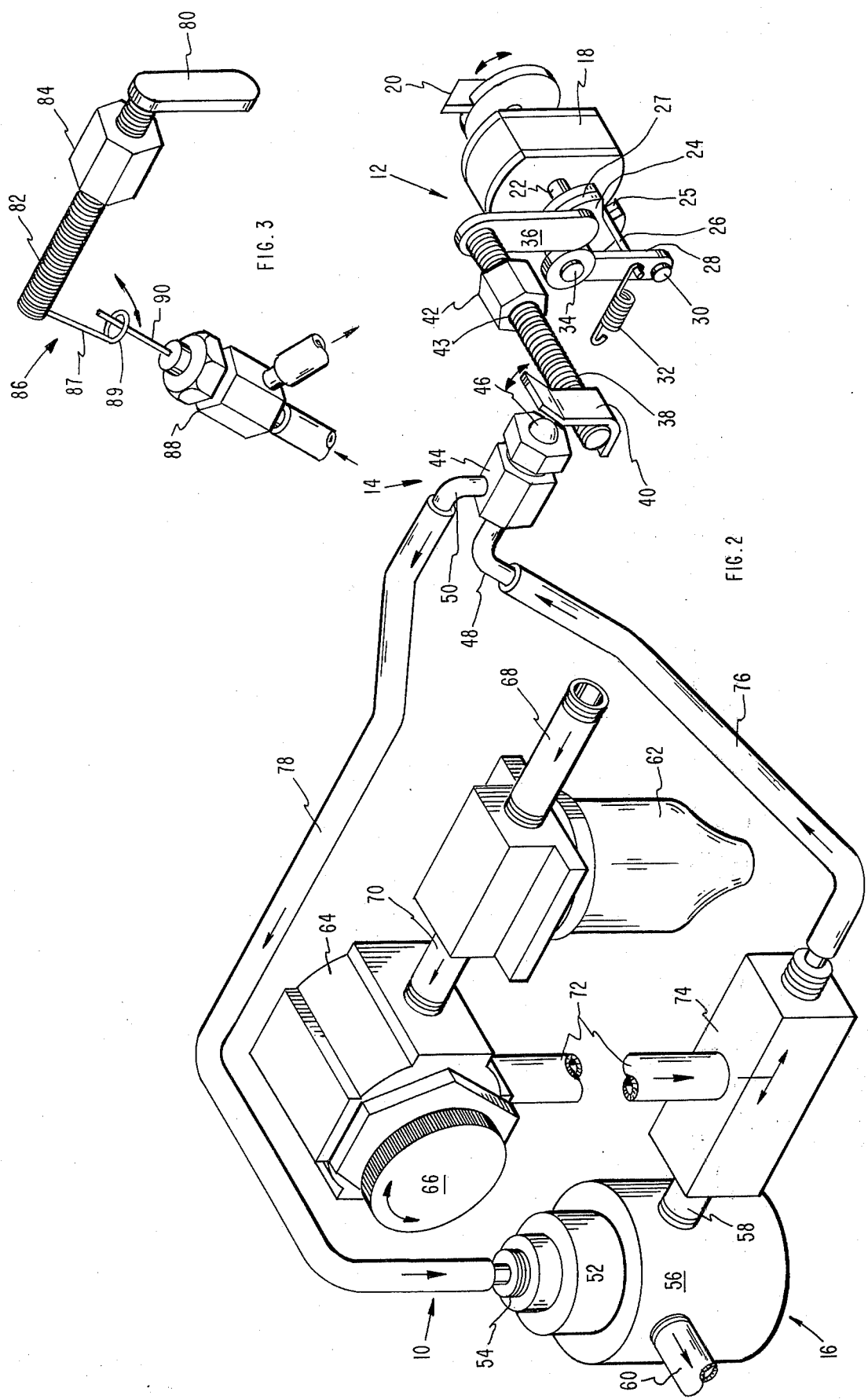

MECHANICAL CONTROL FOR FOGGING SYSTEMS

BACKGROUND OF THE INVENTION

1. Field of Invention

This invention relates to the field of fogging mechanisms, particularly insecticide fogging type mechanisms. A full definition of proper insecticide fogging, as it relates to this invention is the dispensing of an insecticide in controlled micro-particulate form in metered quantities into a known-volume area, such as, for example, processing or storage areas of a food processing plant. In a situation such as a food processing plant, it is necessary to periodically and regularly dispense insecticide into the atmosphere of the food processing plant as an environmental control measure to maintain a clean and insect free environment. The most effective, safe and economical such fogging systems or mechanisms currently available employ compressed air or the like as the propellant. The insecticide is disbursed into the atmosphere in micro-particulate form by forcing a mixture of liquid insecticide and pressurized air or the like through one or more nozzles, which nozzles are specially designed fogging nozzles. By forcing liquid insecticide and pressurized air or the like through such nozzles, the liquid insecticide is broken down into micron size particles capable of remaining suspended in the atmosphere. In that way, insecticide in micro-particulate form, or in other words, an insecticide fog, is dispensed into the atmosphere.

For the purpose of this invention, "fogging" is defined as the process of dispensing a liquid, such as insecticide, into the atmosphere in particle size sufficiently small to provide that the particles remain suspended in the atmosphere for a discernible period of time. In this definition, fogging is distinguished from "spraying" in that spraying contemplates the dispensing of particles of a size large enough so that individual particles fall rapidly onto some surface and do not remain suspended. Fog from a spraying operation is an undesirable byproduct. A typical example of a fogging system is the West Chemical Products, Inc., insecticide dispensing system.

The effectiveness of an insecticide fogging system and the insecticide fog dispensed thereby depends upon many inter-related and variable factors, beginning with the insecticide itself. When fogged, the individual particles of insecticide must be of sufficient concentration to kill the insect species involved and must at the same time be small enough and uniform enough to remain suspended in the atmosphere for a sufficient period of time to fully cover the volume of air space involved. Therefore, the insecticide utilized must first be properly formulated to retain its killing power when broken down into micro-particulate form of particle size small enough to remain suspended in the atmosphere. Once the proper insecticide is determined and utilized, the other variable factors then become dominant. These factors are the quantity of insecticide fog dispensed and the particle size. They are direct functions of pressure, volume and time as these factors relate to supplied propellant. In the final determination of insecticidal fog effectiveness, these other factors are of equal importance to the insecticide itself. They are not adequately controlled with present portable fogging systems; it is the function of this design mechanism to provide such control.

Propellant pressure is normally provided from an external source. With the total cross-section or orifice and piping sizes of a given fogging system being a constant, the volume of propellant, such as compressed air passing through that system, is a function of pressure. At a given nozzle adjustment as long as the externally supplied pressure remains constant, the amount of insecticide dispensed as fog becomes constant per unit of time. Also, under these conditions, particle size of the insecticide fog remains constant.

The amount of insecticide needed for a given application will normally be indicated in the label instructions for that particular insecticide in terms of ounces of insecticide required as fog per thousand cubic feet of air space. Thus, when a known, constant quantity of insecticide fog per unit of time of effective particle size can be delivered, the amount of insecticide needed for a given volume of air space becomes a direct mathematical function of operating time.

2. Prior Art

Little has been done in this area to develop effective means of controlling the period of time during which an insecticide fogging system is allowed to operate or the pressure under which the system operates. Generally, the time period has been left to direct operator control and the pressure has been left to the normal variances of the available external sources, which provides less than adequate control over the amount of insecticide dispensed or the particle size of the insecticide dispensed.

Generally speaking, the insecticide fogging systems utilized are portable systems. This is so because of the fact that the volume of the air space of any food processing plant or the like is generally larger than can be effectively fogged by stationary or permanently mounted fogging nozzles. For this reason, among others, electrical time control has proved ineffective because of lack of coordination between the positioning of electrical power outlets and pressurized air outlets within a food processing plant or the like. This same situation exists when any attempt is made to adapt any other type of time control necessitating an additional external source of power to operate a time control device other than pressurized air outlets within the environment of a food processing plant or the like. Consequently, portable fogging systems have remained essentially devoid of any means of time and pressure control or for that matter any means of control of other variables which are directly related to the effective control of the amount and quality of insecticide fog being dispensed.

Elaborate permanent, stationary, in-house fogging systems have been proposed to include stationary, strategically positioned nozzles combined with a plant wide delivery system and control system. However, systems of this nature have generally proved ineffective, extremely expensive, and difficult to maintain. Any system of this nature, of necessity, becomes extremely elaborate. This is partially due to the fact that the volume of air space involved in most food processing plants or the like is so large that it is usually impossible to provide adequate amounts of pressurized air to operate the entire system and all nozzles thereof simultaneously. Consequently, it then becomes necessary to provide a central control system which will sequentially activate groups of nozzles, zone by zone, within different zones of the food processing plant or the like in question. This need for sequential operation complicates the control system to the extent that the system becomes unjustifiably expensive and cumbersome.

SUMMARY OF THE INVENTION

The present invention comprises a simple, inexpensive, self-contained time control mechanism for use with a portable, air-operated insecticide fogging system. The present invention, in addition, provides means to control those other variable elements of an insecticide fogging system or the like which must be controlled in order to assure the disbursement of the proper amount of insecticide of the proper particle size into a known volume of air space, to effectively fog a given area without unnecessary waste of the insecticide being used, and to reduce the labor time necessary to operate the system.

When the above referenced variables of time, volume and pressure are controlled, the control system provided must, in addition to being simple, be accurate. Presently, if the pressure and volume of compressed air and insecticide introduced into a known volume of air space vary, an operator may simply allow the system to operate for a longer or shorter period of time. Since such fluctuation introduces operator error into the system, the present invention contemplates controlling time, volume and pressure accurately to avoid such operator error.

The invention comprises a mechanical control device including a mechanical timer operating on a clockwork principle, a cam and lever system, and a network of valves and other control devices operated by the cam and lever system and the mechanical timer to precisely control the time and amount of pressurized air being supplied to the nozzles of a portable insecticide fogging system.

OBJECTS OF THE INVENTION

An object of this invention is to provide an inexpensive and effective time control device to regulate the amount of insecticide fog dispensed into a given volume of air space by means of a portable insecticide fogging system.

Another object of this invention is to provide a control device to regulate the pressure of the pressurized air supplied to a portable insecticide fogging system to control the particle size and the quality of insecticide fog dispensed.

A further object of the present invention is to provide a means for precisely controlling the amount of insecticide fog disbursed into a known volume of air space by a portable fogging system without unnecessary waste of insecticide and labor time.

BRIEF DESCRIPTION OF THE DRAWINGS

In order to more fully describe the invention reference is now made to the accompanying drawings, wherein:

FIG. 2 is a perspective view of the mechanism of FIG. 1.

FIG. 3 is a detailed view of a second embodiment of a mechanical timer control device of the time control mechanism of FIGS. 1 and 2.

DETAILED DESCRIPTION OF THE INVENTION

Figure 1:
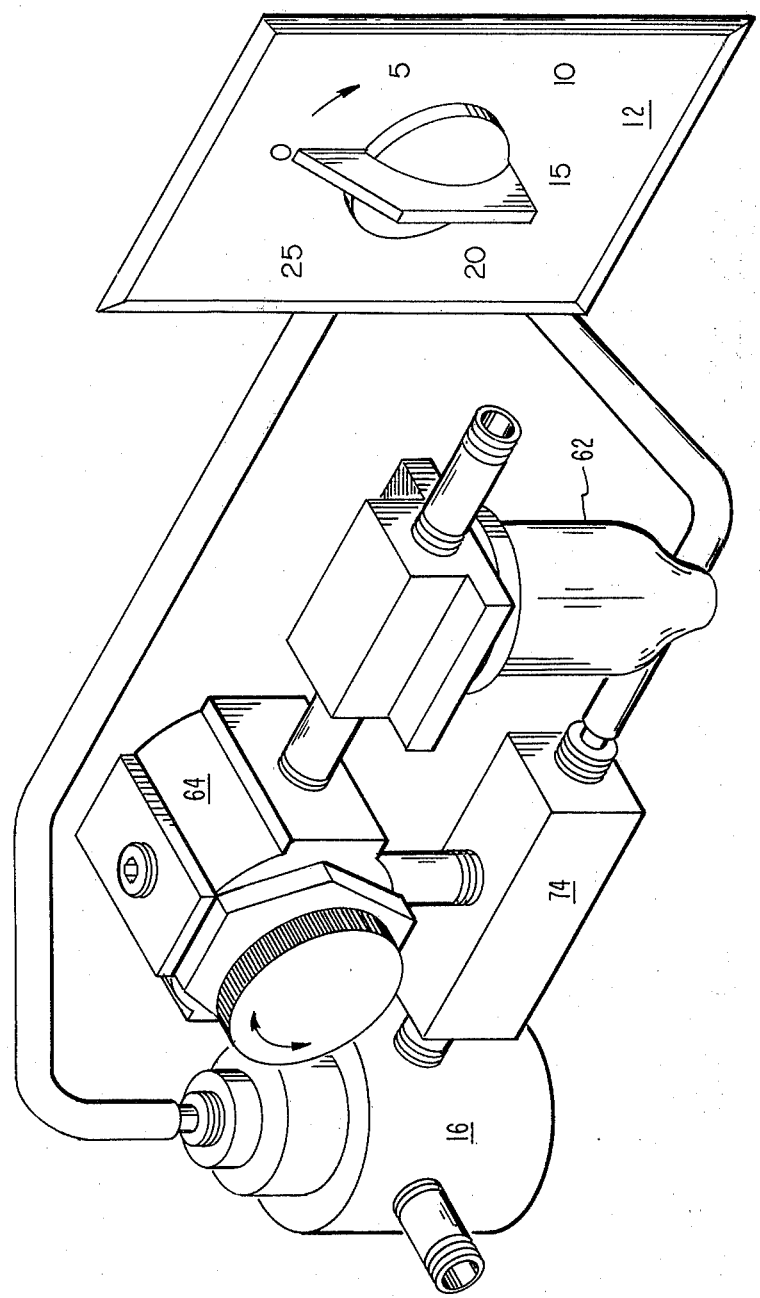
FIG. 1 is a schematic view of the mechanical time control mechanism.

Referring to FIGS. 1 and 2 of the present invention, a time control mechanism 10 is shown there. The time control mechanism 10 comprises a mechanical timer control device 12, a pilot valve 14, and a two stage pneumatic valve 16.

The mechanical timer control device 12 comprises a mechanical clockwork 18 operated by a setting dial 20. The mechanical clockwork 18 is a standard clockwork and may be any of a variety of clockwork devices operating anywhere within the range from a minimum of zero to fifteen minutes to a maximum of zero to sixty minutes. The preferred time range of the clockwork 18 is from zero to thirty minutes, and a typical clockwork satisfactory for this application is the Mark-Time, manufactured by M. H. Rhodes Company.

The mechanical timer control device 12 further comprises a rotary cam device 24 mounted to the clockwork 18 by a shaft 22. The type of standard clockwork 18 usable for this mechanism contains a final-action cam device or rotational motion-transfer device of some description which transfers motion from the clockwork to a selfcontained unit such as the bell in a typical home timer or the contact points of an electrical circuit. In the present invention, that typical clockwork has been adapted and modified for its present application as is described immediately hereafter.

When the basic mechanical clockwork 18 is set in motion by the movement of the setting dial 20 to any time period within the range of operation of the mechanical clockwork 18, the shaft 22 begins rotating, thereby causing the rotary cam device 24 to rotate about its center point. The rotary cam device 24 includes a circumferential indentation 25 in which rests a cam follower 26 when the rotary cam device 24 is in a stationary position. Upon rotation of the rotary cam device 24 the cam follower 26 is forced out of the circumferential indentation 25 and thereafter interacts with a circumferential surface 27 of the rotary cam device 24 throughout the period of time in which the mechanical clockwork 18 is operating.

The cam follower 26 is mounted to a cam follower arm 28 which is capable of rotational movement about a remote pivot point 30. The cam follower 26 is forceably held against both the circumferential indentation 25 and the circumferential surface 27 of the rotary cam device 24 by a spring 32 secured to the cam follower arm 28. One function of the spring 32 is to return the cam follower 26 to engagement with the circumferential indentation 25 of the rotary cam device 24 upon completion of any movement by the clockwork 18.

The cam follower arm 28 further includes a bearing surface 34 remote from the pivot point 30 a distance greater than the distance which the cam follower 26 is remote from the pivot point 30. The location of the bearing surface 34 is such that movement of the follower arm 26 from a position of engagement with the circumferential indentation 25 to a position of engagement with the circumferential surface 27 causes rotary movement of the bearing surface 34 a distance greater than the amount of movement of the cam follower 26.

The bearing surface 34 interacts with a first rotary lever 36 attached to a rotating shaft 38. Rotational movement of the first rotary lever 36 due to the influence of the bearing surface 34 causes rotational movement of the rotating shaft 38 and, consequently, the rotational movement of a second rotating lever 40 mounted to the rotating shaft 38 at a point remote from the point at which the first rotating lever 36 is secured to the rotating shaft 38.

The rotating shaft 38 rotates within a bearing housing 42. The bearing surface between the rotating shaft 38 and the bearing housing 42 constitutes matching threaded surfaces 43. The threaded surfaces 43 of the rotating shaft 38 and the bearing housing 42 comprise loosely fitting thread, thereby allowing for free rotational movement between the bearing surfaces 43. The threaded bearing surfaces 43 constitute a novel element of the present invention in that they provide a simple, inexpensive, and effective bearing surface and, in addition, provide for a dust proof bearing surface between the rotating shaft 38 and the bearing housing 42. This dust proof characteristic is significant when that part of the mechanical time control device 12 between the clockwork 18 and the bearing housing 42 is to be enclosed in a housing, not shown. Under normal circumstances, the above described portion of the mechanical time control device 12 would be included in a housing to protect the above described elements in part from being affected by dust or contamination which one would normally expect to be present in the atmosphere in which this mechanical time control device 12 is being used.

The desired amount of rotational movement of the second rotating lever 40 can be controlled by increasing or decreasing the distance dimension between the remote pivot point 30 and the bearing surface 34, thereby changing the moment arm of the bearing surface 34, the degree of rotational movement of the bearing surface 34 the first rotating lever 36, and, consequently, the degree of rotational movement of the second rotating lever 40. The second rotating lever 40 interacts with the pilot valve 14 in a manner to be described shortly. The pilot valve 14 controls the flow of pressurized air or the like through the two stage pneumatic valve 16 as will likewise be later described.

The pilot valve 14 comprises a valve body 44, an actuating control button 46, an air inlet port 48 and an air exhaust port 50. Typical examples of acceptable pilot valves for the purpose of this invention are the Hair Trigger HTB-30D or HTW-30D, manufactured by the Mead Company, or equal. Functionally, upon actuation of the pilot valve 14 as a result of the second rotating lever 40 depressing the control button 46, pressurized air or the like is allowed to enter the pilot valve body 44 through the air inlet port 48 and exit through the air exhaust port 50. Pressurized air or the like exiting the pilot valve proceeds to the two-stage pneumatic valve 16 as will be described shortly.

The two-stage pneumatic valve 16 comprises a first stage 52, an air inlet port 54 to the first stage 52, a second stage 56, an air inlet line 58 to the second stage 56, and an air exhaust line 60 from the second stage 56. A typical two-stage pneumatic valve satisfactory for the purpose of the present invention is a Humphrey Model 250A pneumatic valve or equal. Functionally, pressurized air or the like entering the first stage 52 via the air inlet port 54 actuates and opens the normally closed second stage 56 to allow pressurized air or the like to enter the second stage 56 through the inlet line 58 and to exit the second stage 56 via the air exit line 60. Pressurized air or the like exiting the second stage 56 of the two-stage pneumatic valve 16 proceeds on to nozzles of an insecticide fogging system as will be later described.

Additional elements of the time control mechanism include an air filter 62 and a pressure regulator 64, of an adjustable type, including a pressure adjusting dial 66.

An acceptable air filter for the purpose of this invention is a Wilkerson A-1019-2 or equal. The air filter 62 is an important element in the present invention. Available pressurized air or the like in the normal industrial plant setting can never be guaranteed to be clean and particle free. Consequently, air filter 62 provides a vital filtering step for the pressurized air being utilized in the time control mechanism 10 as well as the insecticide fogging system as a whole, to eliminate one of the variables previously existing in the operation of such a system. That variable being the long term inaccuracy introduced into a system of this nature as a result of the individual parts of both the time control mechanism 10 and of the nozzles to be described later become corroded and contaminated so as to alter and limit their design function.

Likewise, the pressure regulator 64 is an important element of the present invention in that it also eliminates one of the preexisting variables in the systems being described. Pressurized air or the like from a normal air compression system that might be expected to exist in a typical industrial or food processing plant cannot be expected to be delivered at any constant rate of pressure. However, the accurate control of the pressure of pressurized air or the like being passed to the nozzles of an insecticide fogging system becomes an important element of the present invention. As previously discussed, particle size and quantity of insecticide dispensed per unit of time are both directly related to, and affected by, pressure delivered at the nozzle. In order to insure proper particle size of the insecticide being dispensed, air pressure or the like must be closely maintained. For example, it has been here discovered that the optimum insecticide particle size in an insecticide fogging operation is within the range of 10 to 30 microns. Insecticide particles of this size insure the proper suspension of the insecticide fog in the atmosphere and thereby insure the maximum utilization of the insecticide in the air space of the food processing plant. In order to maintain optimum size, air pressure must be closely regulated. The typical optimum range of air pressure is within the range of 60 psi to 70 psi. Since the purpose of a time control device is to accurately control the amount of insecticide being applied to a given air space as well as to simplify that application, it becomes vital to control and maintain both the optimum insecticide particle size and the amount of insecticide being disbursed to make time control meaningful. A typical example of an acceptable pressure regulator for the present invention is a Wilkerson 2000-2 or equal.

A further significant aspect of the present invention is that it makes use of "miniature" components (filter, pressure regulator and two-stage pneumatic valve). First, this enables the mechanism to be housed in a cabinet suitably compact to fit properly into a typical portable fogging system as previously illustrated in FIG. 4. Second, although the above-mentioned components are "miniature" they are capable, as an integrated assembly, of delivering the substantial quantities of pressurized air or the like required by typical portable fogging systems using a multiplicity of nozzles. Fogging nozzles generally can be adjusted to function well within a broad range of pressure-volume availabilities;

however, they usually function most efficiently within the range of 50 – 90 psi. At 60 psi, a single high-demand fogging nozzle may require up to 6 cfm. Since some fogging systems employ a multiplicity of such nozzles, the volume requirements of propellant become extensive. The present invention, as delineated in FIG. 2, is capable of delivering up to 25 cfm, sufficient to efficiently operate as many as four high-demand nozzles simultaneously, at minimum nozzle pressure in excess of 60 psi.

Additionally significant is the fact that, if necessary, higher volume-pressure deliveries of up to 50 cfm at 90 psi can easily be established without sacrificing employment of the desirable miniature-type components, and without enlarging the basic compact housing. These higher pressure-volume deliveries are accomplished by substituting a larger-capacity air filter (Wilkerson 1144-2G or equal) and adding a second two-stage pneumatic valve piped in parallel. No other changes are needed. Even larger pressure-volume deliveries, of course, could be affected, but would need filter, pressure regulator and solenoid substantially larger than the present submitted design. No changes would be needed in the time control or pilot valve mechanism, but such a substantially larger total assembly offers the probability of being suited as an improvement to semi-permanent or permanent fogging installations instead of the typical portable fogging systems for which this present invention is essentially designed.

The time control mechanism 10 of FIGS. 1 and 2 further includes an external feed line 68 supplying pressurized air or the like from an external source, a feed line 70 connecting the filter 62 with the pressure regulator 64, a feed line 72 connecting the pressure regulator 62 to a tee 74 which in turn is connected to the pilot valve 14 by a feed line 76 and to the two-stage pneumatic valve 16 by inlet line 58, previously described. Also, an additional feed line 78 connects the pilot valve 14 to the first stage 52 of the two-stage pneumatic valve 16. These feed lines will be discussed in more detail subsequently in the operation section of this application.

FIGS. 1 and 2, previously described, depict a first embodiment of that part of the mechanical timer control device 12 which actuates the pilot valve 14. FIG. 3 of the drawings depicts another embodiment of that part of the present invention. As seen in FIG. 3, a first rotating lever 80, a rotating shaft 82, and a bearing housing 84 are depicted which correspond to the first rotating lever 36, the rotating shaft 38 and the bearing housing 42 of FIGS. 1 and 2. Likewise, a valve body 88 is shown which corresponds to the valve body 44 of the pilot valve 14 as shown in FIGS. 1 and 2. The embodiment shown in FIG. 3 comprises a second rotating lever 86 consisting of an arm 87 extending from the rotating shaft 82 and a circular loop 89 secured to an end of the arm 87 remote from the rotating shaft 82. Further the actuating control of the valve body 88 comprises a trigger or whisker actuator 90. The trigger or whisker actuator 90 is positioned so as to interact with the second rotating lever 86 in such a way as the second rotating lever 86 rotates under the influence of the rotating shaft 82, the trigger or whisker actuator 90 is moved from side to side to activate or deactivate the pilot valve 14. The advantage of this embodiment lies in the fact that the positioning of the interacting members need not be so precise as in the previously described embodiment. The trigger or whisker actuator 90 is flexible so as to allow for a wider range of rotational movement by the second rotating lever 86 as compared to the degree of rotational movement permissible with the second rotating lever 40, previously described.

Figure 4:
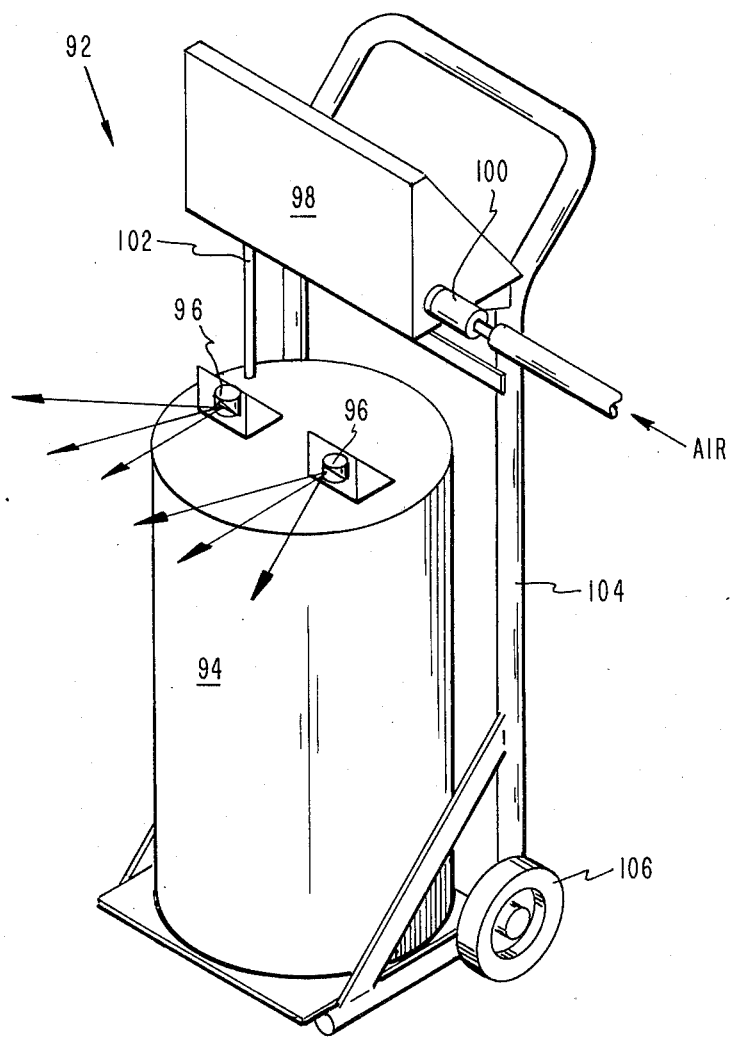
FIG. 4 is a perspective view of the time control mechanism in combination with a typical portable insecticide fogging system.

FIG. 4 of the drawing depicts the time control mechanism of the present invention in its anticipated use in conjunction with typical portable insecticide fogging system 92. The fogging system 92 comprises an insecticide storage tank 94 and a multiplicity of nozzles 96. The time control mechanism, as previously described, is depicted here as a box 98. Pressurized air or the like is admitted to the time control mechanism 98 through an air inlet port 100 and exits the time control mechanism 98 via a feed line 102 which connects to the multiplicity of nozzles 96. The storage tank 94, the multiplicity of nozzles 96 and the time control mechanism 98 may all be mounted on a transportable cart 104 of any generally known design. The transportable cart 104 preferably is mobile in that it is equipped with wheels 106. As can be seen from FIG. 4, the insecticide fogging system is totally portable and requires only one exterior connection, that being connection to supply the pressurized air or the like from an existing system within the food processing plant to the portable insecticide fogging system.

OPERATION

With reference to FIGS. 1, 2 and 4, the operation of the present invention is as follows:

Upon actuation of the clockwork 18 of the mechanical timer control device 12 by the setting of the setting dial 20 which in turn rotates the cam 24, the cam follower 26, the bearing surface 34, the first rotating lever 36 or 80 and the second rotating lever 40 or 86 to actuate the pilot valve 14, a portion of the pressurized air or the like which has been admitted to the time control mechanism via the air filter and the pressure regulator 64, and which has been divided and directed in opposite directions by the tee 74, is allowed to enter the inlet port 48 of the pilot valve 14 and exit the pilot valve 14 through the exit port 50. The pressurized air exiting the pilot valve 14 is carried to the first stage 52 of the two-stage mechanical solenoid valve via feed line 78. The pressurized air or the like upon entering the first stage 52 of the two-stage mechanical solenoid valve 16 actuates the first stage 52 which in turn actuates and opens the normally closed second stage 56 of the two-stage mechanical solenoid valve 16. Upon the opening of the normally closed second stage 56 of the two-stage mechanical solenoid valve 16, the full volume of the pressurized air or the like within the system which was divided by the tee 74 passes through the second stage 56 and on to the multiplicity of nozzles 96 as shown in FIG. 4 via exit lines 60 and feed line 102. The pressurized air or the like continues to flow through the time control mechanism and on to the fogging nozzle or nozzles 96, thereby being mixed with insecticide contained in the storage tank 94 and being forced into the atmosphere through the nozzle(s) 96 as fog. This process continues until such time as the clockwork 18 of the mechanical timer control device 12 returns to zero, thereby closing the time control mechanism 10 and stopping the fogging operation.

What is being claimed is:

1. A control mechanism for use with a portable fogging system, which portable fogging system comprises an insecticide storage tank mounted to a transportable cart and a multiplicity of nozzles, said control mechanism comprising:
  a. A mechanical clock-operated timer having a range of from a minimum of zero to fifteen minutes to a maximum of from zero to thirty minutes;
  b. A rotary cam device mechanically joined to the mechanical timer comprising a circular disc including a circumferential surface and a single circumferential indentation;
  c. A cam follower interacting with the rotary cam device comprising a pin engaging first the circumferential surface and second the circumferential indentation of the circular disc respectively and a bearing surface remote from the pin but attached to the pin;
  d. A first rotating lever and a second rotating lever rigidly joined by a rotating shaft so that the first rotating lever and the second rotating lever rotate in the same direction, said rotating shaft rotating within a bearing housing on a dust proof bearing surface, the said first rotating lever engaging the bearing surface of the cam follower and being rotated by the bearing surface of the cam follower;
  e. A normally closed pilot valve comprising an inlet port, an outlet port and an actuating means, said actuating means interacting with the second rotating lever only to open the normally closed pilot valve;
  f. A two-stage pneumatic valve, which pneumatic valve controls the flow of compressed air or the like from an external source to the nozzles of the portable fogging system and which pneumatic valve is pneumatically connected with the pilot valve and actuated solely by the pilot valve;
  g. A feed line from the external source to the two-stage pneumatic valve, which feed line includes a tee junction between the external source and the pneumatic valve and a second feed line from the tee junction to the pilot valve, thereby directing compressed air or the like to the pilot valve before said compressed air or the like reaches the two-stage pneumatic valve.

2. A control mechanism as claimed in claim 1 wherein:
  a. The mechanical clock-work timer, the rotary cam device, the cam follower, the first lever and the second lever, the pilot valve and the two-stage pneumatic valve are all miniature in size so as to all fit upon a portable fogging system.

3. A control mechanism as claimed in claim 2 wherein:
  a. The two-stage pneumatic valve delivers compressed air or the like to the nozzles of a portable fogging system at a volume of 25 CFM at a minimum pressure of 60 psi.

4. A control mechanism as claimed in claim 1, including:
  a. A miniature pressure regulator positioned on the feed line from the external source and between the external source and the tee junction, and;
  b. A filter device positioned on the feed line from the external source and between the external source and the tee junction.

5. A control mechanism as claimed in claim 1, wherein:
  a. The actuating means of the pilot valve comprises a depressible button which opens the pilot valve when depressed by interaction with the second rotating lever and closes the pilot valve when not depressed by interaction with the second rotating lever.

6. A control mechanism as claimed in claim 1, wherein:
  a. The actuating means of the pilot valve comprises a flexible whisker switch which moves from side to side by interaction with the second rotating lever to respectively open and close the pilot valve.

7. A control mechanism as claimed in claim 1, wherein:
  a. The dust proof bearing surface of the bearing housing comprises a threaded surface which threaded surface interacts with a threaded surface of the rotating shaft, which threaded surface of the bearing housing and threaded surface of the rotating shaft are matching, loosely fitting threaded surfaces.

* * * * *